INVENTOR:
LESLIE G. HENNING
BY Frank L. Sessions
ATTORNEY.

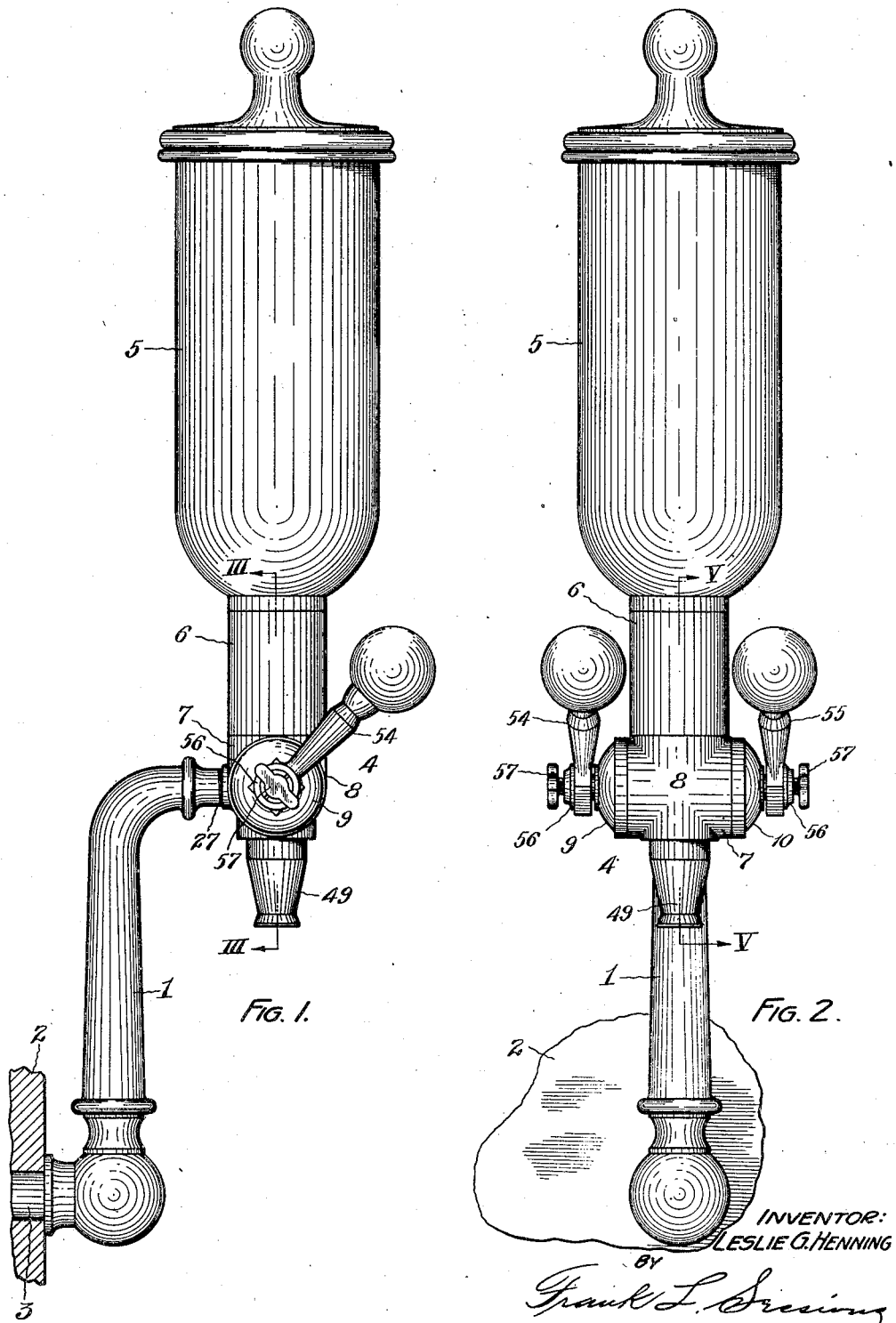

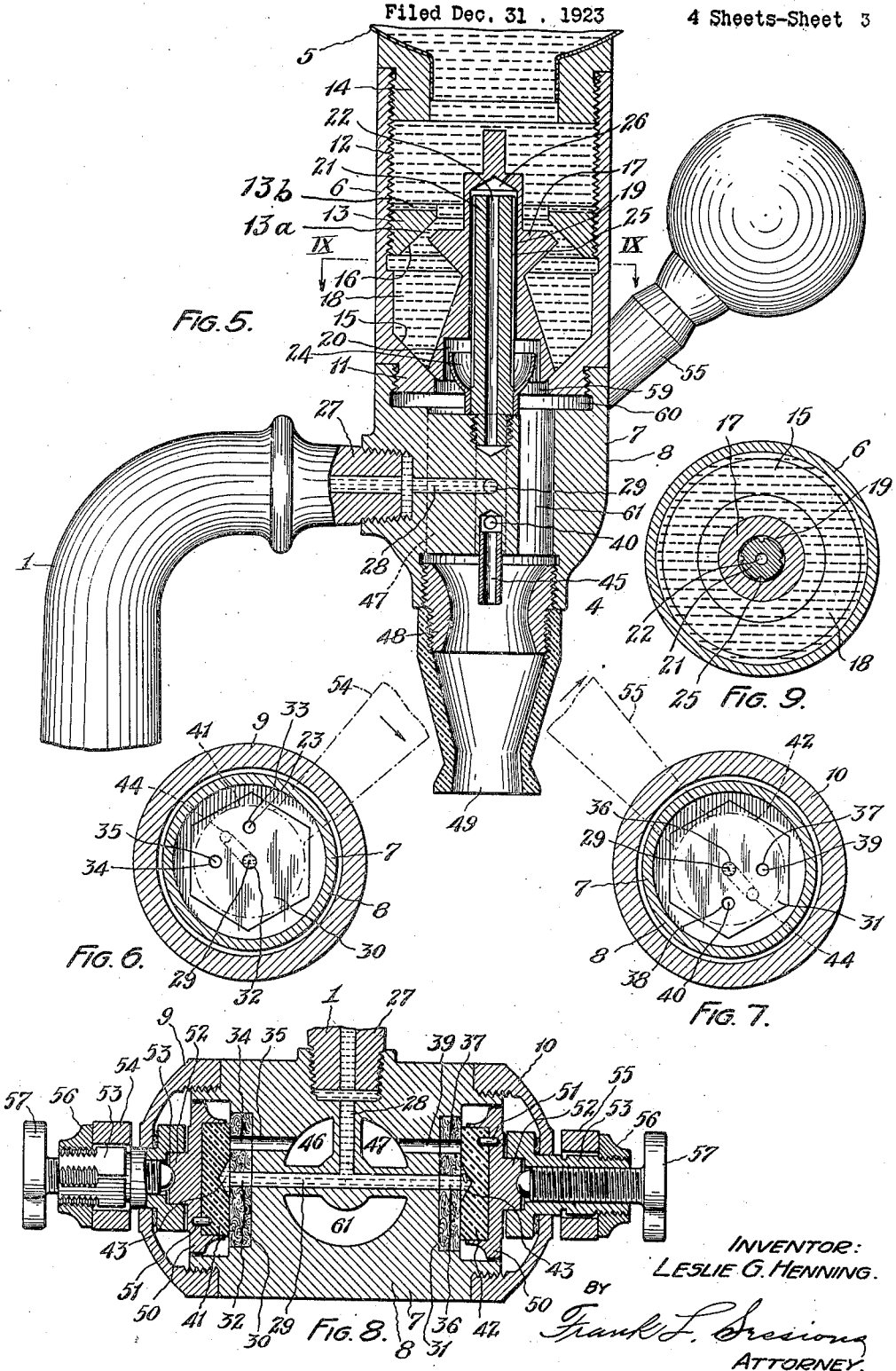

Feb. 17. 1925. 1,526,669
L. G. HENNING
METHOD OF AND APPARATUS FOR MIXING AND DISPENSING LIQUIDS
Filed Dec. 31, 1923 4 Sheets-Sheet 4
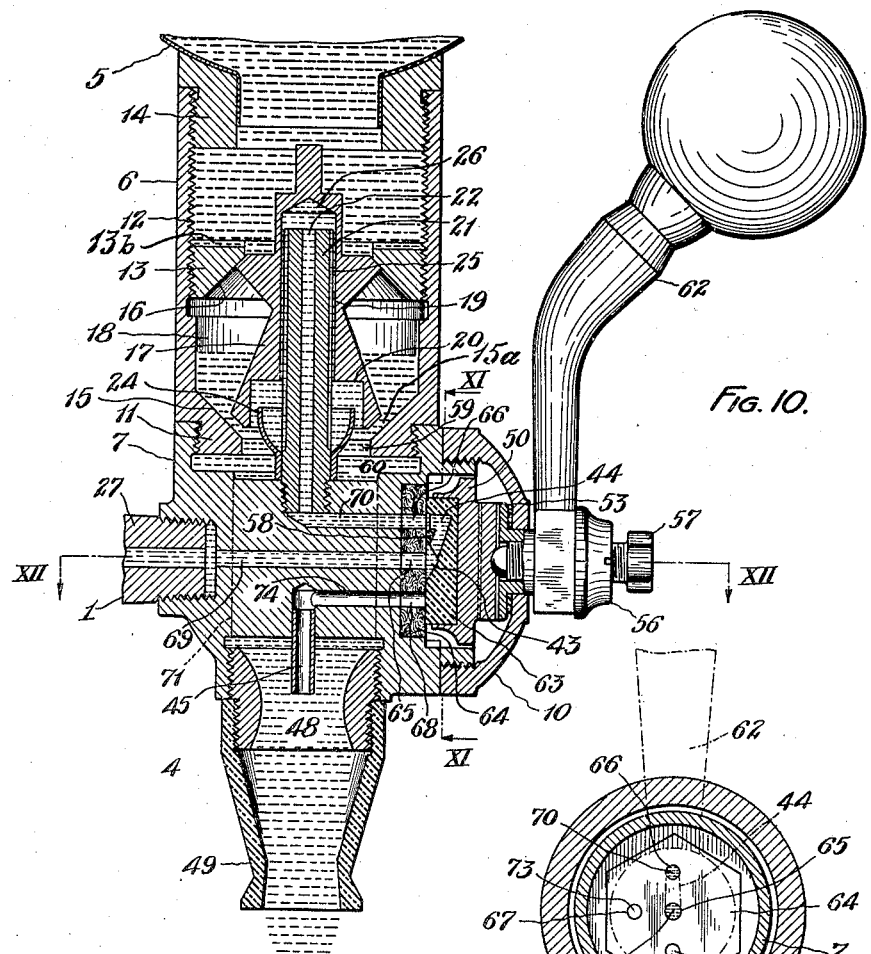
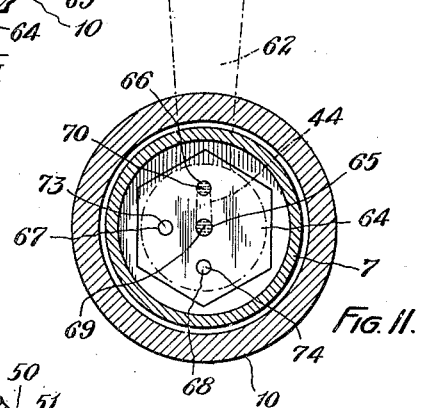
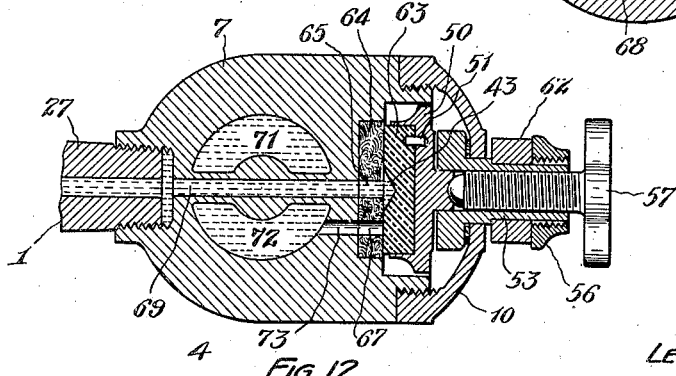
INVENTOR:
LESLIE G. HENNING
BY
Frank L. Sessions
ATTORNEY Patented Feb. 17, 1925.

1,526,669

UNITED STATES PATENT OFFICE.

LESLIE G. HENNING, OF CLEVELAND, OHIO.

METHOD OF AND APPARATUS FOR MIXING AND DISPENSING LIQUIDS.

Application filed December 31, 1923. Serial No. 683,811.

*To all whom it may concern:*

Be it known that I, LESLIE G. HENNING, a citizen of the United States, residing at Cleveland, in the county of Cuyahoga and State of Ohio, have invented certain new and useful Improvements in Methods of and Apparatus for Mixing and Dispensing Liquids, of which the following is a specification.

My invention is especially useful in dispensing soda water or so called soft drinks, in the concocting of which concentrated flavoring syrups are mixed with another liquid, usually carbonated water, supplied at high pressure. Due to the differences in the specific gravities and the viscosities of the liquids, it heretofore has been difficult to accurately measure the syrup and thoroughly mix it with the water before they are put into the drinking glass. Hence, various means have been employed to measure the syrup and to agitate the mixture of syrup and water either in the glass or before they flow into it. My invention aims to overcome these difficulties by accurately measuring the syrup and permitting only the measured quantity to flow from the measure in such a manner that it will be thoroughly mixed with the correct amount of water as they are simultaneously flowing into the glass.

It will be understood that although this specification describes my invention as a beverage dispenser, it may be used for any other purpose for which it is suitable.

Among the objects of my invention are: The provision of a liquid dispenser capable of accurately measuring one of the liquids and thoroughly mixing it with the other liquid; the provision of a liquid dispenser in which the measure of one of the liquids can be readily and accurately adjusted; the provision of a liquid dispenser in which all of the syrup which has been measured for use in the concocting of a glass of beverage is thoroughly mixed with the requisite amount of carbonated water; the provision of a liquid dispenser in which the inlet from the syrup supplying receptacle is completely closed during the mixing of the measured syrup with the carbonated water; the provision of a liquid dispenser which will not become clogged by fruit pulp, seeds or foreign matter; the provision of a liquid dispenser from which the carbonated water may be caused to flow in a fine, high pressure stream or in a large volume, low pressure stream; the provision of a liquid mixer and dispenser which will thoroughly mix and dispense two liquids of different viscosities and different specific gravities; the provision of a liquid dispenser which will dispense either foaming or non-foaming beverages; the provision of a liquid dispenser, in which all of the liquid controls may be effected by a single operating handle; the provision of a liquid dispenser which is simple in its construction and easy to operate; and the provision of a liquid dispenser which may be manufactured at low cost, and be susceptible to ornamental design of pleasing appearance.

The foregoing and other objects are attained by the use of my invention described and shown in the accompanying drawings, in which:

Fig. 1 is a side elevation of a beverage dispenser embodying my invention;

Fig. 2 is a front elevation of the beverage dispenser shown in Fig. 1;

Fig. 5 is a section on line V—V of Fig. 2 but drawn to a larger scale;

Fig. 6 is a section on line VI—VI of Fig. 3;

Fig. 7 is a section on line VII—VII of Fig. 3;

Fig. 8 is a section on line VIII—VIII of Fig. 3;

Fig. 9 is a plan section on line IX—IX of Fig. 5;

Fig. 10 is a vertical section on the central plane of a modified form of my invention in which a single handle is employed for controlling all of the operations of the dispenser;

Fig. 11 is a section on line XI—XI of Fig. 10;

Fig. 12 is a section on line XII—XII of Fig. 10;

Figure 3:
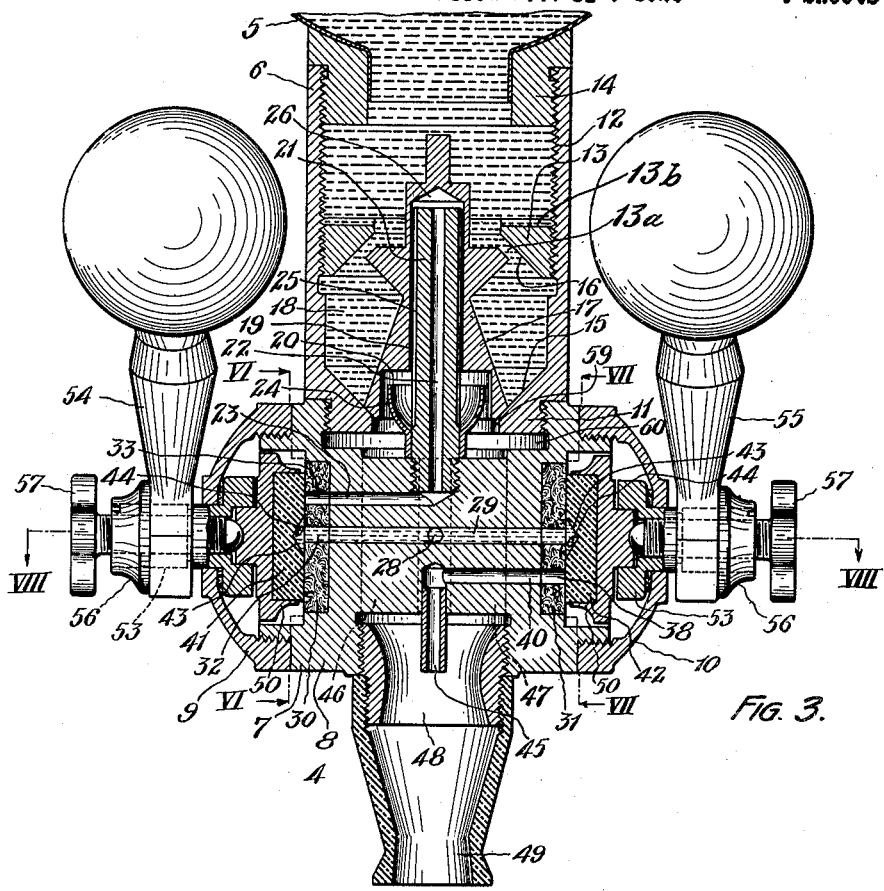
Fig. 3 is a section on line III—III of Fig. 1 but drawn to a larger scale, the dispenser being shown with valves closed.

Referring to the drawings, 1 represents the usual form of draught-arm, which is supported upon the soda fountain structure, 2, and which is connected at 3 to the pipe leading from the source of supply of water under pressure. To the outer end of draught-arm, 1, the mixer and dispenser, 4, may be secured.

Any suitable form of syrup container may be employed. In the drawings there is shown a metal receptacle, 5, supported upon the upper end of the dispenser, 4.

My invention comprises among other features, a syrup-measuring device and a water-control valve. The syrup-measuring device is contained within the housing, 6, while the water-control valve is contained within the housing, 7. The housing, 7, for the water-control valve is composed of the body portion, 8, and end caps, 9 and 10. The housings, 6 and 7, together constitute the housing of the mixer and dispenser, 4. The housing, 6, of the syrup-measuring device is preferably provided with a screw-threaded end, 11, which is adapted to be secured in a correspondingly threaded aperture in the top of the valve-housing body, 8. The upper end of the housing, 6, is threaded internally for a considerable distance as shown at 12 for the purpose of receiving the correspondingly threaded, adjustable plug, 13, and the threaded end, 14, of the syrup-container, 5. The lower end of housing, 6, is beveled internally at 15 around the aperture, 15$^a$, and the lower end of plug, 13, is beveled internally in the opposite direction at 16 around the aperture, 13$^a$. The plug, 13, may be provided with a spanner-wrench slot, 13$^b$.

The syrup-control valve, 17, has its lower end beveled or balled so as to make a liquid tight joint with the beveled surface, 15, when the valve, 17, is supported upon it. The upper end of valve, 17, is beveled or balled to make a liquid tight joint with the surface, 16, of the plug, 13, when the valve, 17, is pressed upward.

The space, 18, between the beveled surfaces, 15 and 16, constitutes the syrup-measure.

The valve, 17, is normally, yieldingly held by gravity in its lower position where it closes the outlet, 15$^a$ and opens the inlet, 13$^a$ of the syrup measure. It will be understood that any suitable means providing yielding pressure may be employed to hold valve, 17, in this position. The valve, 17, is provided with a central, longitudinal aperture, 19, having a closed upper end, 26, while its lower end is enlarged as shown at 20. Secured to and rising upwardly from the center of the top of body, 8, is a tube, 21, which is provided with a central aperture, 22, connecting with a duct, 23. Tube, 21, is surrounded at its base by a cup or inverted skirt, 24, which is detachably secured to tube, 21, preferably by having a sliding fit thereon. Cup, 24, may be discarded when only foaming drinks are to be dispensed as will be further explained.

The aperture, 19, in valve, 17, is slightly larger in diameter than tube, 21, to permit the valve to have free vertical sliding movements and to provide an outlet for the liquid under pressure which enters through tube, 21. The outer surface of tube, 21, may have vertical grooves, as shown at 25 in Fig. 9, to augment the liquid conducting capacity of the space between the valve, 17, and tube, 21.

The operation of this portion of my invention is as follows:

Assuming that the syrup-measure, 18, is full of syrup and that valve, 17, is seated upon surface, 15, thereby closing the outlet, 15$^a$, of syrup measure, 18, water under pressure is admitted through duct, 23, into tube, 21. The upward pressure of the water upon the inner surface, 26, of the valve, 17, lifts the valve and causes its upper, outer, beveled or balled end to press upon the beveled surface, 16, thus closing the inlet, 13$^a$, and preventing the flow of syrup from the syrup-container, 5, which is above it. By the same movement of valve, 17, its lower end is raised from its seat upon the beveled surface, 15, and the liquid in the measure, 18, is permitted to run down through the syrup measure outlet, 15$^a$. The water which rises through aperture, 22, of tube, 21, is diverted by the closed end of the aperture, 19, downwardly through grooves, 25, and the space between tube, 21, and the bore of the aperture, 19, of valve, 17, into the cup, 24. From the cup, 24, the water is directed upwardly into the enlarged aperture, 20, and then downwardly out of the aperture, 20, and dissolves and mixes with the syrup which flows out of the annular opening of valve, 17, in a tubular stream which encompasses the water. Air, which may enter through the discharge nozzle and carbonic acid gas from the charged water, if it be used, rises up through the syrup to the top of measure, 18, so that the syrup flows freely out of it. By the time sufficient water has flowed to fill the drinking glass, the measure, 18, is completely emptied and the syrup has been thoroughly dissolved by and mixed with the water. Upon the closure of the valve, which shuts off the water from duct, 23, the valve, 17, again falls to its seat upon surface, 15, closing the syrup outlet, 15$^a$, and opening inlet, 13$^a$, allowing more syrup from the container, 5, to enter the measure, 18. It will be observed that the valve, 17, is moved by liquid pressure which responds to the opening of the water-supply valve.

It will be observed that the valve, 17, is adapted in one position to open the inlet, 13$^a$, and close the outlet, 15$^a$, and in another position to open the outlet, 15$^a$, and close the inlet, 13$^a$, of the syrup-measure, 18. It is shown as a double-ended or double-seated valve.

By adjusting the position of plug, 13, in the housing, 6, the size of the measure, 18, may be varied as desired. The housing-body, 8, is provided with a threaded aperture for receiving the end, 27, of the draught-arm, 1. A duct, 28, is provided in the housing-body, 8. It connects with a horizontal duct, 29, extending lengthwise throughout the body, 8. Leather valve-seats, 30 and 31, may be provided at the ends of the body, 8, and are preferably of hexagon shape held against rotation by being seated in hexagonal recesses as shown in Figs. 6 and 7. Valve-seat, 30, is provided with a hole, 32, which registers with the central duct, 29, and holes, 33 and 34, which register with ducts, 23 and 35, respectively. Valve-seat, 31, is provided with a central hole, 36, which registers with the central duct, 29, of the body, 8. Other holes, 37 and 38, are provided in valve seat, 31, which register with ducts, 39 and 40, respectively.

Valves, 41 and 42, are provided for controlling the flow of water through the holes in valve-seats, 30 and 31, respectively. Each of valves, 41 and 42, is provided with a recess, 43, at its center over the holes, 32 and 36, respectively of valve-seats, 30 and 31. A valve port, 44, is provided in each of valves, 41 and 42. It is connected to the central aperture, 43, and is adapted to register with a duct-opening 33, 34, 37 or 38 as the case may be when the valve is rotated.

Duct, 40, connects with a vertical, fine-stream nozzle, 45, and ducts, 35 and 39, connect with discharge openings, 46 and 47, which are adapted to discharge water at low pressure through the nipple, 48, and large nozzle, 49. Valves, 41 and 42, are preferably made of hard fiber or bakelite and may be reenforced by metal valve-holders or tumblers, 50, to which they may be secured for rotation therewith by dowel pins, 51, or other means. Valve-holders, 50, are preferably provided with tongues, 52, which are adapted to fit in corresponding slots in the enlarged ends of the valve-operating spindles, 53.

Operating handles, 54 and 55, preferably have square holes which fit over the square ends of the operating spindles, 53, and may be secured thereto in known manner by means of nuts, 56. The operating spindles, 53, are provided with longitudinal apertures, which are threaded to receive adjusting screws, 57. The operating spindles, 53, are supported by bearing apertures in the caps, 9 and 10, in known manner. It will be observed that by adjusting the screws, 57, the pressure of the valves, 41 and 42, upon the leather valve-seats, 30 and 31, may be varied.

Bridge portions, 58, separate the central recesses, 43, of valves, 41 and 42, from the port openings, 44.

In the form of my invention shown in Figs. 1 to 9, inclusive, two operating handles, 54 and 55, are employed. The operation of this device as a beverage mixer and dispenser is as follows: Assuming that the container, 5, contains the syrup and that the mixer and dispenser is connected to a charged-water supply by the draught-arm, 1, as shown, then, to mix and dispense the beverage the operator places the drinking glass under the nozzle, 49, and turns the handle, 54, in a clock-wise direction as shown in Fig. 1, and as indicated by arrow in Fig. 6, until the port, 44, of valve, 41, registers with duct, 23. (See Fig. 4.) This permits the charged-water from the draught-arm to pass through ducts, 28 and 29, port 44, and duct 23, into the aperture, 22, of tube, 21. The pressure of the water in aperture, 19, will lift valve, 17, from its seat upon the surface, 15, and press it upwards against the surface, 16, opening outlet, 15$^a$, and closing inlet, 13$^a$. The charged-water will then run down through the grooves, 25, and the clearance space between tube, 21, and the wall of aperture, 19, in valve, 17, into the cup, 24, which breaks the pressure of the water and directs it upward into aperture, 20. From aperture, 20, it flows downwardly through the opening, 59, in the bottom of housing, 6, through the space, 60, between the bottom of housing, 6, and the top of body, 8, then through the channels, 61, 46, and 47, nipple, 48, and the large discharge nozzle, 49, to the drinking glass.

While the water is thus flowing through the path described, the syrup from the measure, 18, flows down through the opening, 59, where its is dissolved and carried away in solution by the water. The glass may be filled in this manner with practically no bead or foam upon the top of the liquid in the glass due to the breaking of the pressure of the water by the cup, 24. If the glass should not be quite full when the handle, 54, is returned to the off position shown in Fig. 1 of the drawings, the handle may be pushed backwards until the valve port, 44, registers with duct, 35, when clear water will run in a slow stream from the draught-arm through ducts, 28, 29, valve port, 44, duct, 35, and opening, 46, through the nozzle, 49, to the glass.

Figure 4:
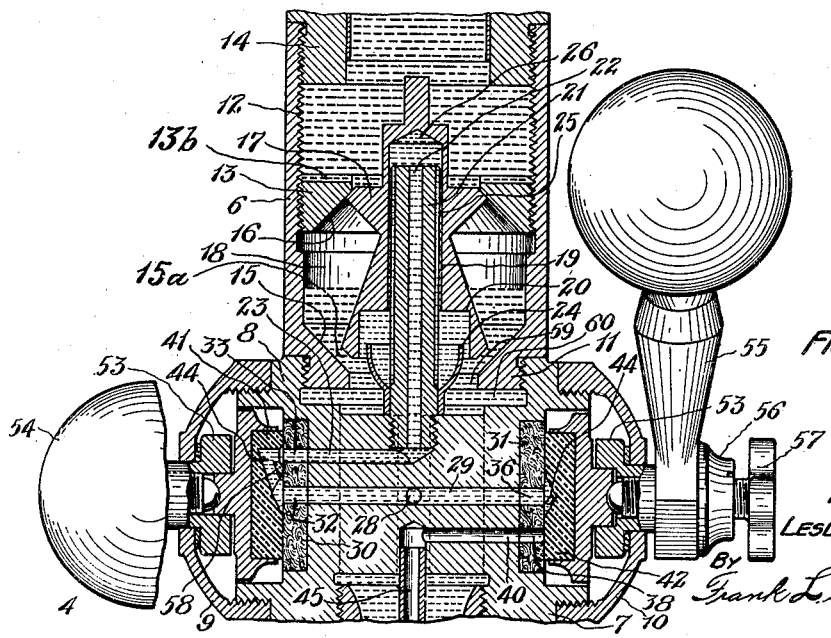
Fig. 4 is a view similar to Fig. 3 but with the measuring valve open and the syrup and water being mixed and drawn from the dispenser.

Should it be desired to raise a bead or foam on the top of the liquid in the glass, the handle, 55, at the right hand of Fig. 2 may be operated to connect the draught-arm with the fine-stream nozzle, 45, to squirt a swift fine stream of clear water into the glass. This may be accomplished by pushing handle, 55, backwards, as shown by arrow in Fig. 7, until the port, 44, of valve, 42, connects the central duct, 29, with the duct, 40, which leads to the fine-stream nozzle, 45, as seen in Figs. 3 and 4.

To draw a slow stream of clear water without syrup, handle, 55, may be pulled forward from the position seen in Fig. 2, and Fig. 7, in order to connect central duct, 29, with duct, 39, from which the water will pass to the discharge channel, 47, and flow through the nipple, 48, and nozzle, 49, into the drinking glass.

In the form of my invention shown in Figs. 10, 11 and 12, a single handle, 62, is employed. This handle is shown located in the central plane of the draught-arm, but it is obvious that it may be disposed at one side of the draught-arm, as for instance in the position of handle, 55, of Fig. 2. The functions of valves, 41 and 42, of the form of my invention shown in Figs. 1 to 9, inclusive, are all performed by the single valve, 63, shown in Figs. 10 and 12. This is accomplished by providing the valve-seat, 64, with the central port, 65, and other ports, 66, 67, 68, as shown. Instead of employing two ducts, 28 and 29, at right angles to each other as shown in Fig. 8, the modified form of my invention shown in Figs. 10 to 12, inclusive, employs a single duct, 69, which extends from the point at the rear, where it connects to draught-arm, 27, through to a point at the front of the housing-body where it connects with the central opening, 65, of valve-seat, 64.

The operation of the modification shown in Figs. 10, 11 and 12, is as follows: The water pressure being present in duct, 69, the operator first moves the handle, 62, until the port, 44, connects duct, 69, with duct, 70, as shown in Fig. 10, whereupon valve, 17, is lifted by the water pressure as shown and the syrup and the water flow together downwardly through the opening, 59, through the space, 60, and then through the openings, 71 and 72, through the nipple, 48, and nozzle, 49, into the drinking-glass. If it should be desired to let the water flow slowly from duct, 69, into the drinking-glass, the handle, 62, should be turned until the port, 44, registers with opening 67, which connects with duct, 73. This will permit the water to flow slowly through the large passage, 72, down through the nipple, 48, and nozzle, 49, to the glass. When it is desired to direct a small swift stream through nozzle, 45, into the glass, the operator turns the handle, 62, until the port, 44, registers with opening, 68, which connects with duct 74, and the fine-stream nozzle, 45, whereupon the high-pressure water will pass from duct, 69, through port, 44, duct, 74, and nozzle, 45, in a small, swift stream to the drinking-glass held below.

The removable cup, 24, serves to break the pressure and velocity of the carbonated water before it comes in contact with the syrup, thus preventing foaming of the mixture. Any other suitable form of pressure breaking device may be used in place of the cup, 24.

It is sometimes desired to dispense only foaming drinks such as root beer and I have found that my invention can be used for this purpose by removing the cup, 24, from the tube, 21, and operating the dispenser without it. Under such conditions the force of the water is not checked in the manner it is when the cup is used, and consequently active foaming occurs.

By the use of the pressure-breaking cup, 24, beverages, such as coca cola, ginger-ale, etc., may be quickly dispensed without foam It will be observed that the water or other liquid that is supplied through the draught-arm flows down out of the aperture, 20, past the bottom opening of valve, 17, through opening, 59, and there mixes with the syrup which is flowing out of the syrup-measure. The opening, 59, from the syrup-measure below the bottom of the syrup-valve, therefore, may be described as a mixing-throat.

When the valve, 17, is lifted from its seat, 15, the syrup from the measuring chamber, 18, flows through the annular outlet, $15^a$, and throat, 59, in the form of a hollow thin-walled tube. The water, under pressure, flowing downwardly from aperture, 19, strikes the cup, 24, and is deflected upward into aperture, 20, and then downward in a whirling, churning stream inside of this thin-walled tube of syrup. The syrup is quickly dissolved and washed away by this erosive action of the water at its confluence with the syrup. The large surface area of syrup is also exposed to the action of the carbon dioxide gas liberated from charged-water when it is used, and the syrup is, to a certain extent, carbonated thereby.

When the pressure-breaker, 24, is not used, the high pressure water issuing unchecked from aperture, 19, bursts into aperture, 20, and, passing into throat, 59, dissolves and washes away the syrup as thoroughly as when the pressure-breaker is used. The unchecked, swiftly-moving water, however, causes the mixture of syrup and water to foam and it is better to use the pressure-breaker when it is desired to dispense non-foaming beverages.

It will be observed that the liquid measure, 18, has an inlet port, $13^a$, and an outlet port, $15^a$, and that the valve member, 17, is adapted to be moved in one direction simultaneously to close the inlet and open the outlet port, and to be moved in another direction simultaneously to open the inlet and close the outlet port, and that these movements take place alternately. I have found, when using the ordinary soda fountain syrups and carbonated water that good results are obtained when the opening, 59, is one inch in diameter, the tube, 21, is three eighths inch in diameter and the valve, 17, lifts three sixteenths inch.

It should be observed that the syrup measure, 18, has no air vent and that it is entirely closed except for the valve controlled inlet and outlet openings. I have found that the syrup measure requires no air vent as the water flowing down through aperture, 20, thoroughly washes the heavier, more viscous syrup off from the surfaces of the mixing throat. The stream of liquid being turbulent and broken as it passes through the mixing throat affords opportunity for air and carbon dioxide gas to rise through the syrup in the measure, 18, so that the syrup from the measure flows down continuously to replace that which has been washed away by the more rapidly moving water.

By the term "balled" used herein is meant the forming of the end of the valve, 17, in the shape of a spherical surface for contacting with the valve-seat.

I make no claim for the well-known parts, such as the operating handles, water-control valves, water-control valve adjusting means and discharge nozzle, which I employ in my invention as they are well known in the art.

Among the advantages of my invention for mixing and dispensing beverages are: The exact measuring of the syrup which is to be used preventing wastage and insuring uniformity of flavor; the thorough mixing of the syrup with the water as it is discharged into the glass making it unnecessary to stir with a spoon thus insuring cleanliness; simplicity of mechanism; simple and expeditious operation, resulting in making it possible to serve more customers in a like period than has heretofore been possible with any of the beverage dispensing devices known to me; the absence of adjustments which can be tampered with making it impossible for the operator to change the adjustment of the syrup measure without taking off the syrup receptacle which obviously is so inconvenient that the operator would not attempt to do it while serving a customer; and the capacity for passing fruit pulp, fruit seeds and even bits of foreign matter such as cork or paraffin which sometimes get into the syrup. Dispensers with which I am familiar frequently become clogged but my invention permits the use of large unobstructed passages for the syrup and for the mixture and these large passages do not become clogged. My invention has a further advantage due to the fact that no air vent to the syrup measure is necessary. Where such air vents are used they frequently become choked by the formation of sugar at the syrup level resulting in inefficient operation, improper mixtures and poor service.

I claim:—

1. The method of mixing two liquids which consists of causing one liquid to flow in a hollow tubular stream and another liquid to flow in a hollow tubular stream inside of said first named stream.

2. The method of mixing two liquids of different pressures which consists of causing the liquid of lower pressure to flow in a hollow tubular stream and the liquid of higher pressure to flow in a hollow tubular stream inside said first named stream.

3. In a liquid mixer and dispenser, a liquid measure having an inlet and an outlet, a valve adapted when in one position to open said inlet and close said outlet and when in another position to close said inlet and open said outlet, and means for applying fluid pressure to said valve to operate it.

4. In a liquid measure and dispenser, a liquid measure having oppositely disposed inlet and outlet openings, a valve in said measure adapted to be moved in one direction to open said outlet and close said inlet and to be moved in another direction to open said inlet and close said outlet, said valve being normally yieldingly held to open said inlet and close said outlet, and means for directing fluid under pressure against said valve to open said outlet and close said inlet.

5. In a liquid mixer and dispenser, a syrup measure having oppositely disposed inlet and outlet openings, a tube extending through said outlet, the outside diameter of said tube being smaller than the diameter of said outlet, a longitudinally-movable, double-ended valve in said measure having one end adapted to control the flow of liquid through said inlet and the other end adapted to control the flow of liquid through said outlet, said valve having a longitudinal aperture open at its outer end to loosely receive said tube and provide a liquid passage surrounding said tube but closed at its inner end, a source of syrup supply connected to said inlet, a source of liquid under pressure connected to said tube, and means for controlling the admission of said liquid under pressure to said aperture through said tube whereby the pressure of said liquid moves said valve to close said inlet and open said outlet to permit syrup to run out of said measure and said liquid to mix therewith as it emerges from said aperture.

6. In a liquid mixer and dispenser a liquid measure having oppositely disposed inlet and outlet openings located respectively at the top and bottom of said measure, a valve in said measure adapted to be raised to open said outlet and close said inlet and to be lowered to open said inlet and close said outlet, a mixing throat connected to said outlet, and means for directing liquid under pressure into said mixing throat.

7. In a liquid mixer and dispenser a liquid measure having oppositely disposed inlet and outlet openings located respectively at the top and bottom of said measure, a valve in said measure adapted to be raised to open said outlet and close said inlet and to be lowered to open said inlet and close said outlet and means for directing liquid under pressure against the under side of said valve to hold said valve in position to close said inlet and open said outlet, said valve being normally held by gravity at the bottom of said measure to open said inlet and close said outlet.

8. In a liquid mixer and dispenser a syrup measure having oppositely disposed inlet and outlet openings located respectively at the top and bottom of said measure, a double seated valve in said measure adapted to have vertical movement therein to open said outlet and close said inlet or to open said inlet and close said outlet, said valve having an aperture extending upwards from the bottom of the valve short of the top thereof, a tube extending vertically upwards into said aperture the dimensions and shape of said aperture and said tube being such that a liquid passage is provided between the tube and the wall of the aperture, a source of supply of liquid under pressure connected to the lower end of said vertically extending tube, and a valve controlling the flow of said liquid through said tube.

9. In apparatus for mixing and dispensing two liquids a measure for one of the liquids having oppositely disposed inlet and outlet openings, a double ended valve in said measure having one end adapted to control the flow of liquid through said inlet and the other end adapted to control the flow of liquid through said outlet, said valve being normally, yieldingly held in position to open said inlet and close said outlet, connections whereby when the other liquid is flowing its pressure moves said valve to open said outlet and close said inlet, and means controlling the flow of said last named liquid.

10. A liquid mixer and dispenser comprising a housing having a mixing-throat provided with an inlet and an outlet, a source of supply of liquid under pressure, liquid-conducting means connected between said source of supply and said inlet, a valve controlling the flow of liquid through said liquid-conducting means, a syrup container, a syrup-measure between said syrup container and said mixing throat having a syrup-inlet from said syrup-container and an annular syrup-outlet surrounding and adapted to discharge a hollow tubular stream of syrup into the inlet of said mixing-throat, and a syrup-valve controlling the flow of syrup through said syrup-measure.

11. A liquid mixer and dispenser comprising a valve-housing, a liquid valve in said valve-housing, a source of supply of liquid under pressure, a syrup container, a syrup measure between said valve-housing and said syrup container having an inlet from said syrup container and an outlet to said valve-housing, a syrup valve in said syrup measure adapted when in one position to close said outlet and open said inlet and when in another position to open said outlet and close said inlet, said syrup valve being normally, yieldingly held to close said outlet, and means responding to the opening of said liquid valve to operate said syrup-valve to open said outlet and close said inlet.

12. In apparatus for mixing and dispensing liquids, a source of supply of liquid under pressure, a source of supply of syrup, a housing having a syrup measure and a mixing throat, said syrup measure being provided with an inlet connected to said source of supply of syrup and an outlet connected to a mixing throat, a syrup valve controlling said outlet adapted when opened to discharge a hollow stream of syrup into said mixing throat, and connections between said source of supply of liquid under pressure and said mixing throat adapted to discharge a stream of liquid under pressure concentrically into said hollow stream of syrup after it has passed through said outlet.

13. In apparatus for mixing and dispensing liquids, a source of supply of syrup, a source of supply of liquid under pressure, a housing having a mixing throat having an inlet opening for said syrup connected to said supply of syrup, an inlet opening for said liquid under pressure connected to said supply of liquid under pressure, and a mixture outlet, means controlling the flow of syrup into said mixing throat, a valve controlling the flow of liquid under pressure into said mixing throat, and means for breaking the pressure of said liquid under pressure between said valve and said mixing throat.

14. A liquid mixer and dispenser comprising a housing having a mixing throat provided with an inlet and an outlet opening, a source of supply of liquid under pressure, a syrup container, a syrup measure between said syrup-container and said mixing throat inlet, a syrup valve in said syrup-measure controlling the flow of syrup from said container into said measure and from said measure into said throat, liquid conducting means between said source of supply of liquid under pressure and said mixing throat inlet, the opening of said syrup valve into said throat being adapted to discharge a hollow tubular stream of syrup into said mixing throat and said liquid conducting means being adapted to discharge liquid under pressure into said hollow tubular stream, and a valve controlling the flow of said liquid under pressure.

15. In a liquid mixer and dispenser a syrup valve adapted to deliver a hollow stream of syrup and a water conductor having an opening adapted to deliver a stream of water into the interior of said stream of syrup.

16. The combination with a source of syrup supply and a source of water supply, of a syrup measure connected to said source of syrup supply, said measure having an annular syrup outlet adapted to discharge a hollow syrup stream, a water conductor connected to said source of water supply having an aperture adapted to discharge water concentrically into said hollow syrup stream after it has passed through said syrup outlet, a valve controlling the flow of syrup through said syrup outlet, a valve controlling the flow of water through said water conductor and means for operating said valves.

17. The combination with a source of syrup supply and a source of water supply, of a syrup measure connected to said source of syrup supply, said measure having a syrup outlet adapted to discharge a syrup stream, a water conductor connected to said source of water supply having an aperture adapted to discharge water into said syrup stream, a valve controlling the flow of syrup through said syrup outlet, a valve controlling the flow of water through said water conductor, means for operating said last named valve, and connections whereby said first named valve is opened by the pressure of water in said water conductor.

18. The combination with a source of syrup supply and a source of supply of carbonated water under pressure, of a liquid mixer and dispenser comprising a housing having a syrup measure, a water inlet connected to said source of water supply, a mixing throat and a mixture outlet, said syrup measure having a syrup inlet connected to said source of syrup supply and a syrup outlet connected to said mixing throat, a vertically movable syrup valve in said syrup measure adapted when in its lower position to open said syrup inlet and close said syrup outlet, and when in its upper position to open said syrup outlet and close said syrup inlet, a water valve controlling the flow of water through said water inlet, and connections whereby when said water valve is opened said syrup valve is lifted to open said syrup outlet and close said syrup inlet, and when said water valve is closed said syrup valve is lowered to open said syrup inlet and close said syrup outlet.

19. A liquid mixer and dispenser having a water inlet adapted to be connected to a soda-fountain draught-arm, comprising a syrup measure having an inlet and an outlet, a double ended, endwise movable syrup valve in said syrup measure adapted to control the flow of syrup through said syrup measure, a source of syrup supply connected to said syrup measure inlet, a source of supply of carbonated water under pressure connected to said water inlet, a water valve adapted to control the flow of water through said water inlet, and connections whereby when said water valve is opened, said syrup valve is operated to close said syrup measure inlet and open said syrup measure outlet.

20. In apparatus for mixing and dispensing liquids, a source of supply of water under pressure, a source of supply of syrup, a mixing throat for said syrup and water, a syrup measuring chamber having a syrup inlet connected to said source of syrup supply and a syrup outlet connected to said mixing throat, said mixing throat having an outlet for the mixture of syrup and water and an inlet connected to said source of water supply, means controlling the flow of water into said mixing throat, and means operated by the pressure of water flowing into the mixing throat to close said syrup inlet and open said syrup outlet.

21. In apparatus for mixing and dispensing two liquids, a measure for one of the liquids having inlet and outlet openings and means normally closing said outlet opening operated by the pressure of the other liquid controlling the flow of said first named liquid through said inlet and outlet openings.

22. In apparatus for mixing and dispensing two liquids a measure for one of the liquids connected to a source of supply of that liquid and so disposed that the liquid from said source of supply always tends to flow into and out of said measure and means normally preventing the flow of said liquid out of said measure, actuated by the pressure of the other liquid to permit the liquid in said measure to flow out of it.

23. A liquid mixer and dispenser for two liquids characterized by the provision of means normally preventing the flow of one of the liquids actuated by the pressure of the other of the liquids to measure and deliver a definite quantity of the first named liquid.

24. In apparatus for mixing and dispensing two liquids, a measure for one of the liquids having an inlet connected to a source of supply of that liquid and an outlet connected to a mixing throat, said measure being so disposed that the liquid from said source of supply always tends to flow into said inlet and out of said outlet, a source of supply of the other liquid also connected to said mixing throat, means normally, yieldingly held to close said outlet, connections whereby the pressure of said other liquid when flowing into said mixing throat actuates said means to close said inlet and open said outlet to measure a definite quantity of said first named liquid, and a valve controlling the flow of said other liquid to said mixing throat.

25. In apparatus for mixing and dispensing two liquids, separate sources of supply of said liquids, a housing having a mixing throat having separate, concentric inlets for said liquids, and liquid conducting means between said inlets and said sources of supply of said liquids, means controlling the flow of one of said liquids into said mixing throat, and means operated by the pressure of said one of said liquids controlling the flow of the other of said liquids into said mixing throat.

26. In apparatus for mixing and dispensing two liquids, separate sources of supply of said liquids, a housing having a mixing throat having separate, concentric inlets for said liquids, liquid conducting means between said inlets and said sources of supply of said liquids, a measure for one of said liquids between its source of supply and said mixing throat, and means operated by the pressure of one of said liquids controlling the flow of liquid into and out of said measure.

27. In apparatus for mixing and dispensing two liquids, separate sources of supply of said liquids, a housing having a mixing throat having separate, concentric inlets for said liquids, liquid conducting means between said inlets and said sources of supply of said liquids, a measure for one of said liquids between its source of supply and said mixing throat, and means adapted to be operated by liquid pressure to control the flow of liquid through said measure.

28. In a liquid mixer and dispenser the combination of a liquid measure connected to a source of supply of liquid, a valve controlling the flow of said liquid through said measure, fluid pressure means for operating said valve, a second valve controlling the application of fluid pressure to said fluid pressure means to operate said first named valve, and fluid conducting means for conducting said fluid from said fluid pressure means and discharging it into said liquid flowing from said measure.

29. In a liquid mixer and dispenser, a housing having a mixing throat, a syrup measure adapted to deliver a measured quantity of syrup into said throat, a valve in said measure controlling the flow of syrup therethrough, said housing having a plurality of ducts one of which is adapted to be connected to a source of supply of liquid under pressure and another of which is adapted to direct said liquid under pressure against said valve to operate it, and means controlling the flow of said liquid under pressure through said ducts.

30. In a liquid mixer and dispenser, a housing having a mixing throat, a syrup measure adapted to deliver a measured quantity of syrup into said throat, a valve in said measure controlling the flow of syrup therethrough, said housing having a plurality of ducts one of which is adapted to be connected to a source of supply of liquid under pressure, another of which is adapted to direct said liquid under pressure against said valve to operate it, and a third one of which is adapted to conduct said liquid under pressure directly into said mixing throat, and a valve controlling the flow of said liquid under pressure adapted when in one position to connect said first and second named ducts, when in another position to connect said first and third named ducts and when in another position to prevent the flow of said liquid under pressure.

31. In a liquid mixer and dispenser the combination of a source of supply of liquid under pressure, a source of supply of syrup, a housing having a mixing throat and a rib extending transversely across said throat, a duct in said rib extending therethrough from front to rear of said housing, a syrup measure above said throat having an inlet connected to said source of supply of syrup and an outlet connected to said throat, a vertically movable syrup valve in said measure, said syrup valve being normally yieldingly held in its lowermost position to close said outlet and open said inlet, a second duct in said rib extending from the front of said rib to a point beneath said syrup valve, a vertical extension to said second duct opening upward and adapted to deliver liquid against said syrup valve, and a valve having a port adapted in one position to connect said ducts to permit the flow of said liquid under pressure and when in another position to disconnect said ducts to prevent the flow of said liquid therethrough.

32. In a liquid mixer and dispenser a syrup measure having oppositely disposed inlet and outlet openings located respectively at the top and bottom of said measure, a double seated valve in said measure adapted to have vertical movement therein to open said outlet and close said inlet or to open said inlet and close said outlet, said valve having an aperture extending upwards from the bottom of the valve short of the top thereof, a tube extending vertically upwards into said aperture the dimensions and shape of said aperture and said tube being such that a liquid passage is provided between the tube and the wall of the aperture, a source of supply of liquid under pressure connected to the lower end of said vertically extending tube, a pressure-breaking cup surrounding said tube presented upwards to receive liquid issuing from said passage, and a valve controlling the flow of said liquid through said tube.

33. In a liquid mixer and dispenser a housing having a mixing throat having a downwardly presented outlet, a syrup measure adapted to deliver a measured quantity of syrup into said throat, a syrup valve controlling the flow of syrup through said measure, said syrup valve being adapted to be operated by fluid pressure, said housing having four ducts, to wit, first, a duct adapted to be connected to a source of supply of liquid under pressure; second, a duct adapted to direct liquid under pressure against said valve to operate it and discharge said liquid into said mixing throat simultaneously with the flow of syrup thereinto; third, a duct adapted to discharge said liquid into said throat to cause said liquid to flow from the outlet of said throat in a slow stream; and fourth, a duct terminating in a fine downwardly turned nozzle adapted to discharge a fine swift stream downwardly through the outlet of said throat, and a valve having a port registering with said first named duct and adapted when said valve is operated to register with any one or none of the remaining three ducts whereby the flow of liquid under pressure may be controlled and directed.

34. In a liquid mixer and dispenser, a housing having a mixing throat provided with a syrup inlet at the top and a mixture outlet at the bottom thereof, a vertically movable valve controlling the flow of syrup through said syrup inlet, means to operate said valve, a source of syrup supply connected to said syrup inlet, a source of supply of liquid under pressure, and liquid conducting means adapted to discharge said liquid under pressure into said mixing throat.

35. In a liquid mixer and dispenser, a housing provided with a mixing throat, a liquid measure, a valve controlling the flow of liquid from said measure to said throat adapted when operated to deliver a measured quantity of liquid into said throat, and means including a source of supply of liquid under pressure to operate said valve by liquid pressure and simultaneously deliver a stream of said liquid under pressure into said throat.

36. A liquid mixer and dispenser comprising a housing having a mixing throat, a source of supply of liquid under pressure connected to said mixing throat, a source of supply of syrup connected to said mixing throat, separately operable valves respectively controlling the flow of said liquid under pressure and of said syrup, said syrup valve being normally yieldingly held closed, and means responding to the opening of the valve that controls the flow of said liquid under pressure to open the valve that controls the flow of syrup.

37. In a liquid mixer and dispenser, a housing having a mixing throat, a source of supply of liquid under pressure, a source of supply of another liquid, liquid conducting means between said last named source of supply and said mixing throat, a valve controlling the flow of liquid through said conducting means, fluid-pressure-actuated means for operating said valve, and liquid conducting means including said fluid-pressure-actuated means between said source of supply of liquid under pressure and said mixing throat.

38. In a liquid mixer and dispenser, a housing provided with a mixing throat, a source of supply of syrup, a source of supply of liquid under pressure, a valve controlling the flow of syrup into said mixing throat the port opening of said valve being adapted to deliver a hollow tubular stream, and liquid conducting means from said source of supply of liquid under pressure to said mixing throat adapted to discharge said liquid under pressure within said hollow stream of syrup.

39. In apparatus for mixing and dispensing two liquids, separate sources of supply of said liquids, a housing having a mixing throat, separate liquid conducting means between said sources of supply and said mixing throat, a valve controlling the flow of one of said liquids into said mixing throat said valve being adapted to cause said liquid to enter said throat in an annular stream, and a valve controlling the flow of the other one of said liquids into said mixing throat.

40. In apparatus for mixing and dispensing liquids, a source of supply of water under pressure, a source of supply of syrup, a mixing throat for syrup and water, said mixing throat having an inlet connected to both of said sources of supply and an outlet for the mixture of syrup and water, means controlling the flow of water into said mixing throat, and means operated by the pressure of water flowing into the mixing throat controlling the flow of syrup into the mixing throat.

41. In apparatus for mixing and dispensing two liquids, separate sources of supply of said liquids having outlets adapted to discharge into the same receptacle, means controlling the flow of one of said liquids from its source of supply into said receptacle, and means normally preventing the flow of the other of said liquids operated by the pressure of said one of said liquids controlling the flow of the other one of said liquids into said receptacle.

42. In apparatus for mixing and dispensing liquids, a source of supply of syrup, a source of supply of liquid under pressure, a housing having a mixing throat having an annular inlet opening for said syrup connected to said supply of syrup, an inlet opening for liquid under pressure concentric with said syrup inlet connected to said supply of liquid under pressure and adapted to discharge said liquid axially into the hollow stream of syrup flowing through said syrup inlet into said mixing throat, and a mixture outlet, an endwise-movable valve controlling the flow of syrup into said mixing throat and means controlling the flow of liquid under pressure into said mixing throat.

43. A liquid mixer and dispenser comprising a housing having a mixing throat provided with an inlet and an outlet, a source of supply of liquid under pressure, liquid-conducting means connected between said source of supply and said inlet, a valve controlling the flow of liquid through said liquid-conducting means, a source of supply of syrup, syrup-conducting means between said source of syrup supply and said mixing throat, said mixing throat having a syrup-inlet surrounding and adapted to discharge a hollow tubular stream of syrup into said mixing throat, and a valve controlling the flow of syrup into said mixing throat.

44. In a liquid mixer and dispenser, a housing having a mixing throat provided with an inlet and an outlet, said housing having a chamber connecting with said mixing throat through said inlet, a valve in said chamber adapted to control the flow of liquid from said chamber to said mixing throat, said valve being yieldingly held to prevent said flow of liquid, said valve having an aperture extending into it from its discharge end short of the other end thereof, a tube extending into said aperture providing a liquid passage between the outer wall of said tube and the wall of said aperture adapted to discharge liquid into said mixing throat, a source of supply of liquid under pressure connected to the outer end of said tube, and a valve controlling the flow of said liquid under pressure through said tube.

45. In a liquid mixer and dispenser, a housing having a mixing throat provided with an inlet and an outlet, a vertically movable valve adapted to close said inlet, said valve being normally, yieldingly held closed, said valve having an aperture extending upwards from the bottom short of the top thereof, a tube open at its top extending into said aperture, provision being made for the return of liquid from said aperture above the top of said tube to said mixing throat, and liquid conducting means connected to said tube below the top thereof.

46. In apparatus for mixing and dispensing liquids, a source of supply of liquid under pressure, a source of supply of syrup, a housing having a chamber connected to said source of supply of syrup, said chamber having an outlet, a valve controlling the flow of syrup through said outlet, said valve being normally yieldingly held closed, connections whereby when said liquid under pressure is flowing its pressure moves said valve to open it, means controlling the flow of said liquid under pressure, and means conducting said liquid under pressure into the stream of syrup flowing through said outlet.

47. In apparatus of the class described, a source of supply of liquid under pressure, a housing having a chamber adapted to contain syrup, said chamber having an outlet, a valve controlling the flow of syrup through said outlet, the opening of said valve being adapted to discharge a hollow stream of syrup from said chamber, liquid conducting means connected to said source of liquid under pressure adapted to discharge said liquid into said hollow stream of syrup, and a valve controlling the flow of said liquid under pressure.

48. In apparatus of the class described a housing having a chamber provided with a syrup inlet and an outlet, a source of supply of syrup connected to said syrup inlet, a syrup valve controlling the flow of syrup through said outlet, a source of supply of liquid under pressure, liquid conducting means between said source of supply of liquid under pressure and said housing adapted to direct said liquid under pressure against said syrup valve to open it and to then discharge said liquid under pressure through said outlet, and means controlling the flow of said liquid under pressure.

49. In apparatus for mixing and dispensing two liquids a receptacle for one of the liquids provided with an outlet opening, and means normally preventing the flow of said one of said liquids through said outlet opening operated by the pressure of the other of said liquids controlling the flow of said first named liquid through said outlet opening.

50. In apparatus for mixing and dispensing two liquids, a source of supply of water under pressure, a source of supply of syrup, a mixing throat for syrup and water having an inlet for syrup, an inlet for water and a mixture outlet, and removable means for breaking the pressure of said liquid under pressure before it enters said mixing throat.

51. In a liquid mixer and dispenser, a housing having a mixing throat provided with an inlet and an outlet, said housing having a chamber connected with said mixing throat through said inlet, a valve in said chamber adapted to control the flow of liquid from said chamber to said mixing throat, said valve being yieldingly held to prevent said flow of liquid, said valve having an aperture extending into it from its discharge end short of the other end thereof, a tube extending into said aperture providing a liquid passage between the outer wall of said tube and the wall of said aperture, a source of supply of liquid under pressure connected to the outer end of said tube, and a pressure breaking member surrounding said tube.

52. In a liquid mixer and dispenser, a housing having a mixing throat provided with an inlet and an outlet, a vertically movable valve adapted to close said inlet, said valve being normally yieldingly held closed, said valve having an aperture extending upwards from the bottom short of the top thereof, a tube open at its top extending into said aperture, provision being made for the return of liquid from said aperture above the top of said tube to said mixing throat, liquid conducting means connected to said tube below the top thereof, and removable liquid pressure breaking means adapted to break the force of liquid discharged from said aperture before it enters said mixing throat.

53. In apparatus for mixing and dispensing two liquids, separate sources of supply of said liquids, a housing having a mixing throat having inlets for said liquids, liquid conducting means between said inlets and said sources of supply of said liquids, means operated by the pressure of one of said liquids controlling the flow of the other of said liquids into said mixing throat and removable pressure breaking means for breaking the pressure of the first named liquid before it mixes with the other of said liquids.

54. In apparatus for mixing and dispensing two liquids, separate sources of supply of said liquids, a housing having a mixing throat having inlets for said liquids, liquid conducting means between said inlets and said sources of supply of said liquids, means operated by the pressure of one of said liquids controlling the flow of the other of said liquids into said mixing throat and removable pressure breaking means between said pressure operated means and said mixing throat for breaking the pressure of the first named liquid before it mixes with the other of said liquids.

55. In a liquid mixer and dispenser, a mixing chamber having liquid inlets and a mixture outlet, a source of supply of liquid under pressure, a source of supply of another liquid, liquid conducting means between said sources of supply of liquid and said mixing chamber and removable pressure breaking means adapted to break the pressure of said liquid under pressure before it mixes with said other liquid in said mixing chamber.

56. In apparatus for mixing and dispensing two liquids, a measure for one of the liquids having an inlet and an outlet, said inlet being connected to a source of supply of that liquid, means controlling and normally permitting the flow of liquid through said inlet, means controlling the flow of liquid through said outlet and connections whereby the pressure of the other liquid operates said first named means to close said inlet.

57. In apparatus for mixing and dispensing two liquids, separate sources of supply of said liquids, a receptacle for one of the liquids having an inlet opening and an outlet opening, liquid conducting connections from the source of supply of said one of the liquids to said inlet opening, the normal pressure of said liquid tending to cause it to flow through said inlet into said receptacle and thence out of said outlet, a valve normally preventing the flow of liquid through said outlet, and liquid conducting connections for the other of said liquids whereby when said other liquid is flowing through said last named connections its pressure operates said valve to permit the flow of said first named liquid through said outlet.

LESLIE G. HENNING.